UNITED STATES PATENT OFFICE.

ANGELINA J. KNOX, OF BOSTON, MASSACHUSETTS.

IMPROVED PROCESS FOR PRESERVING AND RESTORING NATURAL FLOWERS.

Specification forming part of Letters Patent No. 46,247, dated February 7, 1865.

*To all whom it may concern:*

Be it known that I, ANGELINA J. KNOX, of Boston, in the county of Suffolk and State of Massachusetts, have made a new and useful invention having reference to the preservation and restoration of natural flowers, of which the following is a specification.

The art of making wax flowers is not new and is well known. It is also well known that an innumerable number of persons have old and dried flowers which are preserved as keepsakes and from valued associations.

My invention consists in so restoring and treating these flowers that they may be made to present all the appearance of the most beautiful wax flowers, while they are really natural flowers rendered indestructible.

The process consists as follows: If fresh flowers are to be prepared, the largest ones are taken in pieces, and the leaves separately, together with the small flowers entire, are embedded in fine sand, which is subsequently heated in an oven until it has acquired a heat of about 80° Fahrenheit, when the flowers are to be allowed to remain in it until the moisture is entirely extracted from them by the sand, which also retains them in proper shape while drying.

If old and dried flowers are used, they are to be soaked for short time in warm water, or, which is better, warm alcohol, as it separates sooner, and then smoothed out into shape by the fingers.

The flowers, after having been prepared as above described, are ready for the operation of being covered with wax, the said operation constituting the principal feature of my invention, and is done as follows: A leaf is inclosed between two sheets of wax, such as is used for making wax flowers, and the whole subsequently manipulated by the fingers until the wax is pressed closely to all parts of the leaf. After a sufficient number of leaves necessary to constitute a flower may have been prepared in this way they are to be shaped or molded to the required form and made into a flower in substantially the same manner as wax flowers.

One important advantage of my invention is the fact that very small flowers, as well as parts of broken leaves, may be used, as by folding these broken leaves within the sheets of wax I am enabled to build out or enlarge the leaf or to extend the wax around its edges to any required distance, and then cutting it to the proper size. So with the small, minute flowers, which would otherwise be thrown away as useless, I can inclose one or a number of them in the wax and afterward mold it to any required form—as a rose-bud or snowberry-drop, for instance. In the mode of dipping with wax, as sometimes practiced, this cannot be done.

As before observed, flowers prepared and treated in accordance with my invention combine all the beautiful appearance of real or wax flowers, besides rendering available and making into beautiful objects of art old and dried flowers which have laid away for years as cherished mementos of the past only.

What I claim as my invention, and desire to secure by Letters Patent, is—

The process for restoring, treating, and preserving natural flowers, substantially in the manner as hereinbefore described.

ANGELINA J. KNOX.

Witnesses:
F. A. BROOKS,
FREDERICK CURTIS.